W. GARDINER.
BATTERY CONSTRUCTION.
APPLICATION FILED DEC. 26, 1914.
1,183,810.
Patented May 16, 1916.
2 SHEETS—SHEET 1.
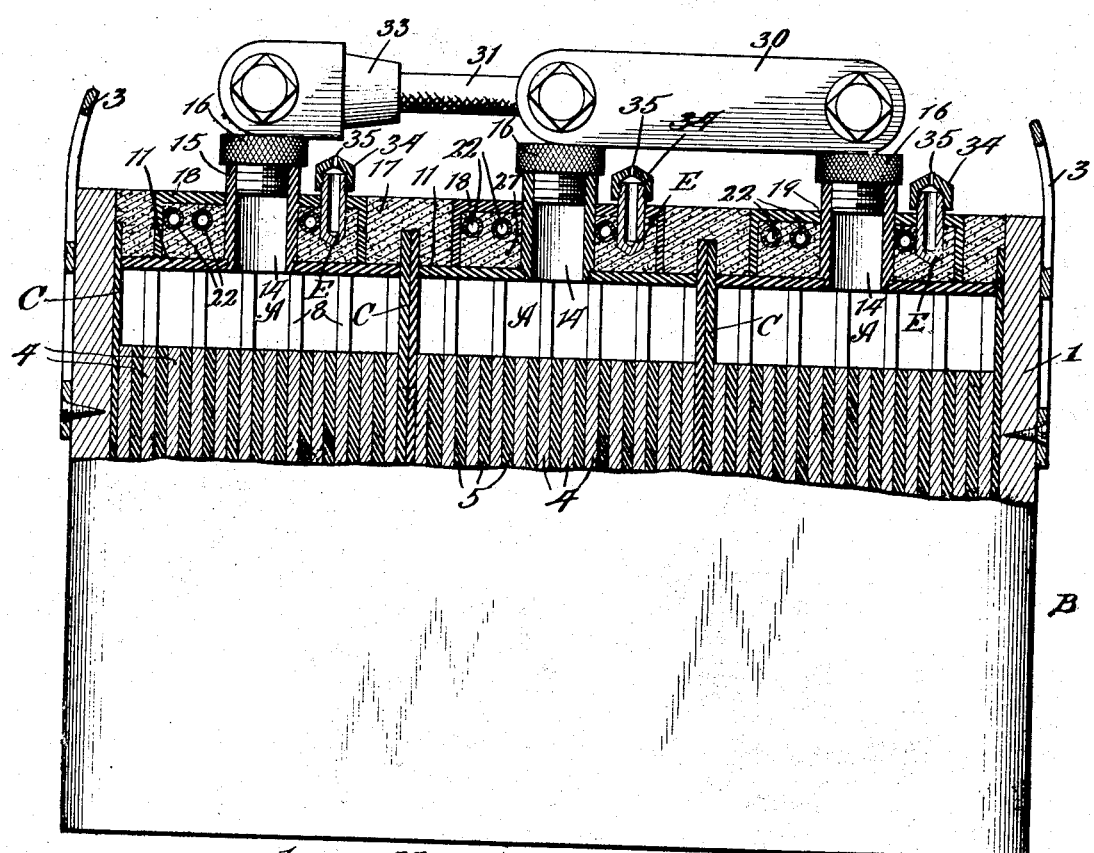
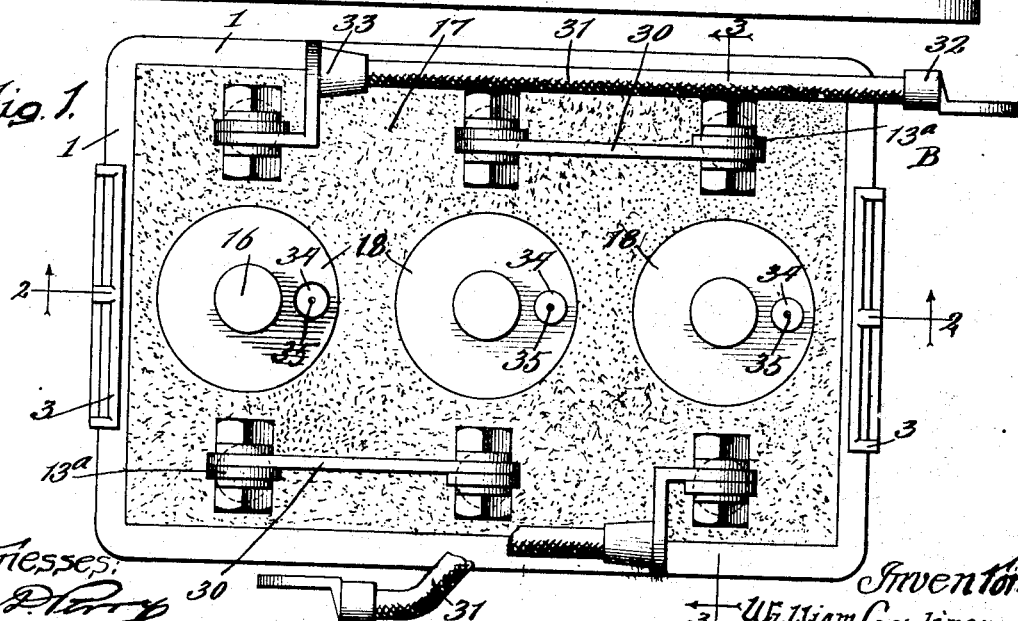

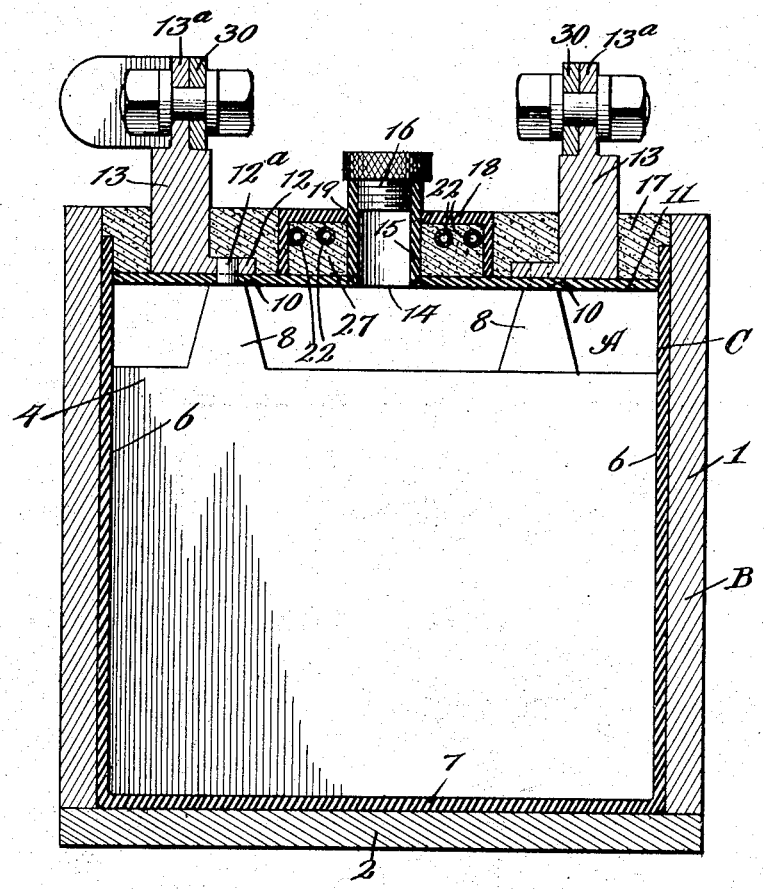
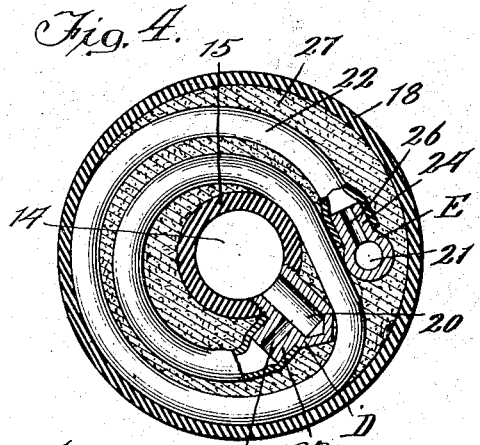
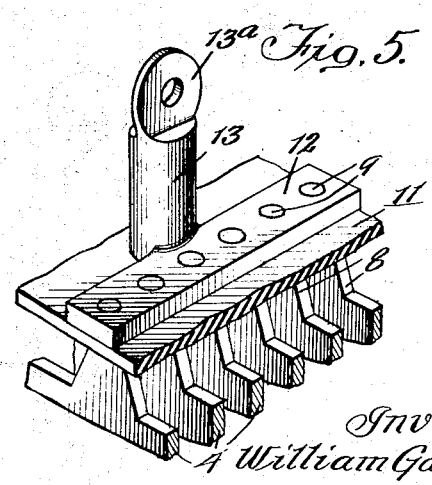

UNITED STATES PATENT OFFICE.

WILLIAM GARDINER, OF CHICAGO, ILLINOIS.

BATTERY CONSTRUCTION.

1,183,810.   Specification of Letters Patent.   Patented May 16, 1916.

Application filed December 26, 1914.   Serial No. 879,019.

*To all whom it may concern:*

Be it known that I, WILLIAM GARDINER, a citizen of the United States of America, and resident of Chicago, Cook county, Illinois, have invented a certain new and useful Improvement in Battery Construction, of which the following is a specification.

My invention relates to an electric battery such as storage batteries and the like, and has more particular reference to improvements in the construction and ventilation of batteries of this character.

One of the objects of my invention is to provide an improved electric battery construction which will be simple, durable and reliable, and effective and efficient in operation.

Other objects of my invention will appear hereinafter.

My invention consists in the features of novelty exemplified in the construction, operation and arrangement of parts hereinafter described, shown in the accompanying drawings, and more particularly set forth in the appended claims.

In the drawings—Figure 1 is a top plan view of an electric battery embodying my invention. Fig. 2 is a central longitudinal section on the line 2—2 of Fig. 1 of the upper portion of said battery. Fig. 3 is a transverse vertical section on the line 3—3 of Fig. 2. Fig. 4 is a transverse detail section substantially on the line 4—4 of Fig. 2. Fig. 5 is a perspective of the terminal lugs of the plates attached to the common connector strip.

In the drawings, I have illustrated my invention as embodied in a storage battery, preferably of the portable type used in automobiles, but it will be obvious to one skilled in the art, after having obtained an understanding of my invention from the disclosures herein made, that my invention may be embodied in other types of batteries, or in fact various other receptacles wherein ventilation is required without the danger of the contents of the receptacle or container being accidentally let out of the receptacle.

The structure shown in the drawings embodies three electric storage cells A, which in this case are preferably identical with the construction, and which are preferably grouped together in a casing or box B to form a battery of unit cells. This casing is preferably rectangular in shape and has side and end walls 1 and a bottom wall 2, and is made of wood or other suitable material for containing the cells and for the protection thereof. This casing also has a couple of handles 3 on its end walls for convenience in handling the battery. The unit or individual cells A, so far as their plate construction and electrical action is concerned, may be of any suitable type.

In the drawings each cell has a plurality of plates 4, between which are the separators 5, and these plates and separators are grouped together within a container or receptacle C which is preferably rectangular in shape and which is substantially one-third of the size of the interior of the casing B, so that three of these cells may be singularly positioned within the said casing, the number of the cells and size of the casing, of course, may be readily varied to suit the requirements. Each cell container C has side and end walls 6 and 7, respectively, these cells being preferably made of such material as is usual in storage batteries and such as will resist the action of the liquid. The side and end walls of these cells extend almost, but not quite, to the upper edge of the casing walls 1.

The plates of the cells have terminal or connector lugs 8 upstanding from their upper edges, these lugs being positioned at one side or the other of the vertical section of the plates, and all preferably arranged so that the terminal lugs 8 of the positive plates will be transversely in line at one side of the center of the cell, and those lugs of the negative plates transversely alined at the opposite side of said center. These terminal lugs have short upstanding cylindrical projections 9 at their extreme upper ends and are arranged so as to form shoulders 10 at the upper ends of said lugs 8. Resting upon these shoulders are cover plates or top walls 11 for the cells. These cover plates are of a material similar to that of the walls of the cell containers and fit within the upper ends of the cell containers so that they may be placed in position after the plates and separators have been placed in their respective positions in the cell containers. These cover plates 11 have holes or perforations corresponding to the projections 9 and through which the projections pass so that the cover plate also serves as a separator to hold the upper ends of the cell plates in their respective positions.

The height of the shoulders 10 with respect to the bottom walls 7 of the cell containers is such that the cover plates will occupy a position somewhat below the upper edges of the cell container walls. In other words, the cover plates 11 are set within or depressed below the tops of the cell containers. The projections 9 extend above the cover plates 11 and are suitably screwed or otherwise fastened in corresponding holes in common connector strips or members 12, which members 12 electrically connect the several plates together in positive and negative groups. These connector strips are put in position after the cover plates 11 have been placed in position, so that they clamp the cover plates 11 between themselves and the shoulders 10 of the plate terminal lugs, thus forming a substantial construction with no loose parts liable to jar or get out of order. Each connector member 12 has an upstanding terminal lug 13 which extends considerably above the top of the cells of the casing and provide convenient means for electrical connection with the battery. The cover plates 11 are provided with openings 14 preferably centrally disposed, and these openings are carried above the top of the cells by means of upstanding tubes or hollow cylinders 15, the lower ends of which are screwed or otherwise fastened to the cover plates 11, so that these tubes and passages formed thereby communicate directly with the interior of the cells. These passages or openings are comparatively large, and are provided for the purpose of removing the liquid contents of the cells, and for gaining access to the interior thereof for such purposes as flushing the cells or other side. In order, however, to close these openings when the battery is in use, and to thereby prevent the liquid from splashing out of the cells and out of the top of the battery, caps 16 are screwed or otherwise removably fastened in the upper ends of the tubes 15. The shallow spaces between the cover plates 11 and the upper edges of the cell walls and casing may be completely filled in with sealing compound 17 of any suitable character, so that the entire upper ends of the cells and casing are completely and effectively sealed against the escape of any of the liquid from the cells. This sealing compound is preferably filled in flush with the upper edges of the casing walls, so that the joints or spaces between the casing walls and the cell walls, and also the joints between the cover plates 11 and the cell walls, are effectively closed and sealed.

In storage batteries of this character, it is essential that ventilation be provided therefor—that it is to say, the interior of the cells should communicate with the outside air, so as to allow the escape of gases when the battery is charged. But it will be obvious that while any direct passage or port which connects the interior of the cell with the outside atmosphere will provide ventilation for the cell, there would be danger of the liquid contents of the cell escaping through these direct ports and slopping over on to the tops of the cells or batteries, and since the liquid contents of battery of this type are usually of a very corrosive nature, the evil effects on surrounding parts and on the exterior of the battery itself arising from the escape of the liquid from the cells is obvious. For these reasons, and in order to avoid these objections, I provide means which provide perfect ventilation for the cells and at the same time prevents the escape of the liquid when the batteries are shaken or jarred during service.

The central upstanding tube 15 preferably carries an inverted cup or dish 18, which when the tube 15 is in position on the cover 11 rises to a point substantially flush with the top edges of the casing, and also with the surface of the sealing compound 17. The tube 15 preferably passes centrally through this cup-shaped member 18, and is fastened thereto at the point 19. Thus an annular space is provided within the cup-shaped member 18 surrounding the tube 15, and within this space I position two port-forming members D and E having communicating angularly disposed ports or passages. The member D is preferably screwed into the wall of the tube 15 within the cup-shaped member 18, and its port 20 communicates with the interior of the tube 15, and thence through the opening 14 to the interior of the cell. The other member E is positioned so that it extends upwardly through the bottom wall of the cup-shaped member 18 and projects above the cup and the upper surface of the battery, and it has a port 21 which communicates directly with the atmosphere or outside air. I connect the ports or passages 20 and 21 in a manner which provides an indirect and comparatively long passage. This may be done in any suitable manner, but I prefer to form this passage by means of a long flexible tube such as a soft rubber tube 22, the ends of which are slipped over or otherwise fastened to the lugs 23 and 24 of the members D and E, as shown clearly in Fig. 4. These lugs 23 and 24 of said members have ports or passages 25 and 26 which communicate with the passages 20 and 21, respectively, so that between the port 20 which communicates with the interior of the cell and the port 21 which communicates with the outside air there is a long and continuous, though indirect, passage through which the gases may escape. The tube 22 may be of any suitable length, but I prefer to provide a comparatively long tube and dispose it in spiral arrangement around the tube 15 within the cup-shaped member 18, as shown clearly in Fig. 4. In this manner substantially two turns may be readily obtained.

After the tube 22 has been placed in position, the cup 18 may be and preferably is filled with a sealing compound 27 in which the tube and the members D and E are embedded, thus forming with the cup-shaped member and tube 15 a substantially integral solid structure. This solid structure forms what may be termed for convenience "a filling and ventilating unit" which is attached to the cover plate 11 by simply screwing the inner end of the tube 15 into the opening 14 of the cover plate, as previously described. This unit is preferably placed in position before the sealing compound 17 is filled in, so that the joints around the unit and also the unit itself will be sealed within the upper end of the cell and will be substantially consolidated therewith. It will thus be seen that by this construction it is difficult, and in fact practically impossible, for any liquid to splash into the indirect ventilating passage through the port 20, circulate through the tube 22, and finally escape through the port 21. This difficulty is further enhanced by the fact that the port 20 not only enters the tube laterally, but is also disposed at some distance above the cover plate 11, so that the liquid will first have to splash into the tube 15 before it could enter the port 20, and even assuming that some of the liquid enters the port 20, it would readily drain back into the cell. It will also be noted that even though by any chance the liquid should enter the port 20 and pass into the rubber tube 22, through the passage 25, it would have to do so through a tortuous passage and could do no harm except perhaps to corrode the rubber or flexible tube 22, but this would have no effect upon the operation of the structure, because even though the tube 22 should be completely corroded or eaten away, there would still exist a perfectly formed passage in the sealing compound 27. It will be noted also that none of the terminal lugs or any of the parts above the cover plates 11 are exposed to the action of the liquid of the cells for the very reason that the cover plates 11 serve as protectors for all the parts thereabove. Furthermore, a solid, compact, substantially integral structure is provided which has no loose parts likely to be shaken or jarred out of order or become displaced in any other manner. In fact, the cover plates 11, the ventilating units and the sealing compound, both within and without the cup-shaped member, are all consolidated together so that in effect a solid, compact wall is formed for the upper end of the storage cells, and in this wall are embedded the ventilating unit and the means thereof which form both the direct and indirect passages communicate with the interior and exterior of the cells. If desired, the port members E which extend above the cup-shaped member may be provided with a small hard rubber cap 34 which may be screwed on to the ends of the members E to protect them. These caps have holes 35 which communicate with the outside air, as shown more clearly in Fig. 2.

The terminal lugs 13, as before mentioned, rise above the top of the battery, and each cell thus has a positive and negative terminal. By means of these lugs, the cells may be electrically connected together, or they may be used separately, as desired. In the structure shown in the drawings, and particularly in Fig. 1, it will be seen that the three cells are electrically connected in series. The permanent connections between the terminal lugs 13 are formed by flat plates or strips 30 which are suitably bolted to the flattened upper ends 13ª of said terminal lugs 13. The leads or conductors 31 which extend to the battery are preferably flexible for convenience in connection. These conductors or leads may be of any suitable length and are provided with terminal heads 32 and 33, as shown clearly in Fig. 1.

It is my intention, instead of furnishing the leads 31 already connected to the battery, to furnish manufacturers or users with the proper length of leads 31 having terminals 33 and 32 at its ends. The terminals 32 of the leads can then be permanently fastened to the automobiles. The disconnection and connection of the battery with these leads can then readily be accomplished by disconnecting and connecting the terminals 33 firmer to the battery terminals 13. Thus whenever the battery is to be removed or disconnected, there will be no necessity of having flexible connections attached to it which are likely to become short-circuited or inconvenienced in other ways.

What I claim as my invention is:—

1. The combination of a receptacle having a port in one of the walls communicating with the interior thereof, a port communicating with the exterior thereof, and a tube surrounding said interior port and embedded entirely within the wall and forming a passage connecting said ports.

2. The combination of a tubular member, means surrounding said tubular member and forming a passage terminating at one end in the interior of said tubular member and at its other end communicating with the outside air, an electric storage cell, means for securing said tubular member to a wall of the cell and in communication with the interior thereof, and means for closing the end of the tubular member.

3. A ventilator unit for storage cells comprising a tubular member, a cup-shaped member surrounding said tubular member and having a port, and means within said cup-shaped member forming a passage connected at one end with said port and communicating at its other end with the interior of said tubular member.

4. A ventilator unit for storage cells comprising a tubular member, a cup-shaped member having a port, means within said cup-shaped member forming a passage connected at one end with said port and communicating at its other end with the interior of said tubular member, and a removable cap for closing one end of said tubular member.

5. The combination of a storage cell having an opening in one of its walls, a tubular member secured to said wall and forming a direct passage between the interior of the cell and the outside air, a hollow cup-shaped member surrounding said tubular member, means forming ports communicating with the outside air and with the interior of said tubular member, a flexible tube surrounding said tubular member within the cup-shaped member and forming a passage between said ports, and a sealing material embedding said flexible tube within said cup-shaped member to form a solid structure.

6. The combination of a storage cell having the cover depressed within said cell to form a shallow space above the cover, storage plates within said cell having terminal lugs extending through the said cover, terminal members common to and secured to a group of said lugs above said cover, and a sealing material filled in said shallow space above the cover and embedding said terminal lugs and common terminal members.

7. The combination of a storage cell having the cover depressed within said cell to form a shallow space above the cover, storage plates within said cell having terminal lugs extending through the said cover, a connector bar common to and attached to a group of said terminal lugs, a terminal post for said connector bar, a sealing material filled in said shallow space above the cover, and embedding said terminal lugs and connector bar, and a casing inclosing said cell.

8. The combination of a storage cell having a cover member set within the upper end thereof to form a shallow space above said cover, said cover having an opening, a tubular member fastened in said opening and forming a direct passage communicating with the outside air, an inverted cup-shaped member surrounding said tubular member, a tube within said cup-shaped member surrounding said tubular member, communicating at one end to the interior of said tubular member and terminating at its other end in a port outside of said cup-shaped member, a sealing substance within said cup-shaped member embedding the tube, and a sealing substance within the shallow space above said cover surrounding said cup-shaped member.

Signed by me at Chicago, Illinois, this 17th day of December, 1914.

WILLIAM GARDINER.

Witnesses:
E. H. CLEGG,
EDGAR FRANCIS BEAUBIEN.